(12) United States Patent
Watanabe et al.

(10) Patent No.: US 6,490,116 B1
(45) Date of Patent: Dec. 3, 2002

(54) RETRACTION CONTROL METHOD AND MAGNETIC DISK APPARATUS

(75) Inventors: Keiko Watanabe, Tsuchiura (JP); Tetsuya Hamaguchi, Ibaraki-ken (JP); Takashi Yoshida, Ibaraki-ken (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 09/288,027

(22) Filed: Apr. 8, 1999

(30) Foreign Application Priority Data

Apr. 13, 1998 (JP) .......................................... 10-100847

(51) Int. Cl.⁷ .............................................. G11B 21/02
(52) U.S. Cl. ........................................................ 360/75
(58) Field of Search ........................ 360/75, 69, 78.12; 318/563, 560

(56) References Cited

U.S. PATENT DOCUMENTS

| | | | | |
|---|---|---|---|---|
| 4,658,308 A | * | 4/1987 | Sander, Jr. ................ 360/75 X |
| 5,455,496 A | * | 10/1995 | Williams et al. .......... 360/75 X |
| 5,495,156 A | * | 2/1996 | Wilson et al. .............. 318/368 |
| 5,663,846 A | * | 9/1997 | Masuoka et al. ............. 360/75 |
| 6,025,968 A | * | 2/2000 | Albrecht ...................... 360/75 |

* cited by examiner

*Primary Examiner*—David Hudspeth
*Assistant Examiner*—K. Wong
(74) *Attorney, Agent, or Firm*—Antonelli, Terry, Stout & Kraus, LLP

(57) ABSTRACT

A magnetic disk apparatus includes that a head positioning actuator assembly is retracted to a predetermined position for retraction at the time of stop of power supply from a power source, an electric power to be supplied to a driving circuit of the actuator assembly at the time of stop of power supply from the power source is supplied in three separate steps with time differences therebetween. First, an electric power for stopping the actuator assembly is supplied. With a second power supply using a small electric power, the actuator assembly starts a retracting operation at a sufficiently low speed so that it reaches the vicinity of a ramp. Thereafter, a third power supply is performed to accelerate the actuator assembly so that it is surely retracted to the predetermined position for retraction. Since the speed of impingement of the actuator assembly upon the ramp at this time can be set to a sufficiently low value, it is possible to reduce the damage of the ramp.

5 Claims, 5 Drawing Sheets

RETRACTION CONTROL METHOD AND MAGNETIC DISK APPARATUS

BACKGROUND OF THE INVENTION

The present invention relates to a magnetic disk device, and more particularly to a control method and a magnetic disk apparatus in which a magnetic head slider is retracted when the supply of an electric power from a power source is interrupted.

The conventional control method of retracting a magnetic head portion of a magnetic disk apparatus at the time of interruption of a power source includes a method disclosed by JP-A-7-211031. Namely, in the case where a head positioning actuator assembly is to be retracted at the time of interruption of power supply, the disclosed retracting method includes a step of charging a capacitor during a usual power source turn-on operation by a voltage which exceeds a power source voltage supplied to the magnetic disk apparatus, a step of discharging the stored current to the head positioning actuator assembly through the switching of the capacitor circuit at the time of interruption of power supply to the device, and a step of driving the actuator assembly to a predetermined position for retraction.

Also, JP-A-3-248379 has disclosed a method for stand-by driving of a magnetic head in which a back electromotive force from a member for driving the rotation of a magnetic disk is supplied to a magnetic head driving member at the time of stop of a magnetic disk driver to transport the magnetic head to a stand-by position at which the magnetic head or a magnetic head supporting member is engaged with a bearing member so that it mounts on (or gets on) the bearing member, thereby supporting the magnetic head on the bearing member in a state in which the magnetic head floats from the magnetic disk. The driving method includes a first step in which a voltage obtained by lowering the back electromotive force from the disk rotation driving member is supplied to the magnetic head driving member so that magnetic head is transported toward the stand-by position to bring the magnetic head into a state in which the magnetic head or the magnetic head supporting member contacts the bearing member but it does not mount on the bearing member, and a second step in which a voltage higher than the voltage supplied in the first step is supplied to the magnetic head driving member to bring the magnetic head or the magnetic head supporting member into an engagement with the bearing member so that the former mounts on the latter.

In the method disclosed by the JP-A-7-211031, a retraction operation is performed after the stop of supply of an electric power of the power source in such a manner that an electric power stored in the capacitor at the time of supply of the electric power is supplied to a magnetic head driving circuit. If this method is applied to a ramp type load/unload mechanism, there is a problem that a head or a head supporting portion impinges upon a ramp portion with a result that the head or the ramp portion is damaged.

In the method disclosed by the JP-A-3-248379, the retraction is made at the time of cut-off of a power source by performing the power supply in two steps by use of the back electromotive force of a rotating spindle motor. Namely, up to the front side of a lifter (or ramp), the magnetic head or the magnetic head supporting member is operated with a low voltage so that it impinges upon the lifter and is stopped. Thereafter, a high voltage is applied so that the magnetic head or the magnetic head supporting member ascends a ramp portion of the lifter.

In this case, the JP-A-3-248379 has stated that since there is employed a construction in which the application of the low voltage is continued immediately after stop of the power source, the magnetic head or the magnetic head supporting member impinges upon the lifter at a low speed. Practically the acceleration of the actuator is however continued so that the speed of the magnetic head or the magnetic head supporting member at the time of impingement thereof upon the ramp portion becomes high. As a result, it is also difficult to prevent the head from being damaged. In order to suppress the speed at the time of impingement to a tolerance, it is required that the voltage to be applied should be made considerably low.

SUMMARY OF THE INVENTION

An object of the present invention is to provide a magnetic disk apparatus of a retraction system using a high reliable ramp load type for reducing the ramp damage so that the speed of impingement on the ramp is made sufficiently low to allow the securely unloading retraction system when the power is even stopped supplying from a power source.

To attain the above object, a retracting method at the time of stop of supply of an electric power from a power source and a magnetic disk apparatus according to the present invention are characterized by comprising means for performing, at the time of stop of power supply from the power source, the supply of an electric power to an actuator assembly driving circuit in three separate steps with time differences therebetween.

A first aspect of the present invention lies in that there is provided means for performing a first power supply immediately after the interruption of supply of an electric power from a power source and performing the next power supply through the operation of a switch after the lapse of a fixed time from the first power supply.

A second aspect of the present invention lies in that there is provided means for detecting the arrival of an actuator assembly at an unload point (or the vicinity of a position at which the actuator assembly contacts a ramp). Immediately after the interruption of supply of an electric power from a power source, a first power supply is performed to a driving circuit of the actuator assembly. Thereafter, a switch is operated at the unload point (or the vicinity of the position of the actuator assembly contacting the ramp) so that the next power supply is started.

A third aspect of the present invention lies in that at the time of interruption of an electric power from a power source, a back electromotive force of a spindle motor is supplied to a head positioning actuator assembly in three separate steps with time differences therebetween.

A fourth aspect of the present invention lies in that means for storing an electric power during a usual power source turn-on operation is provided so that at the time of interruption of supply of an electric power from the power source, the stored electric power is supplied to a head positioning actuator assembly in three separate steps with time differences therebetween.

DESCRIPTION OF THE EMBODIMENTS

Figure 1:
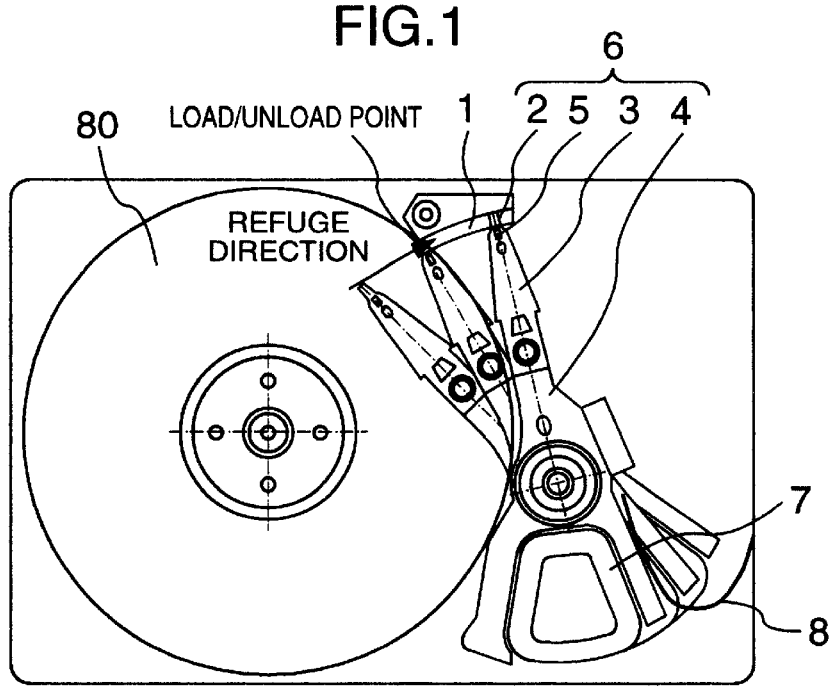
FIG. 1 is a view showing the schematic construction of a magnetic disk apparatus according to the present invention.

FIG. 1 is a view showing the schematic construction of a ramp type load/unload mechanism mounted magnetic disk apparatus to which the present invention is applied.

A magnetic disk 80 as a recording medium is attached to the rotation axis of a spindle motor provided on the center side of the disk. A ramp 1 as a parking position of an actuator assembly 6 is provided outside of the outer periphery of the magnetic disk. Also, there are provided a suspension 3 in which a tab dimple 2 sliding along the ramp 1 is formed and a carriage arm 4 to which the suspension is attached. A head slider 5 provided with a magnetic head portion is provided on the tip side of the suspension 3, and a voice coil motor (VCM) 7 is provided on a side opposite to the head slider 5.

The actuator assembly 6 composed of the suspension 3, the carriage arm 4 and so forth is driven by the VCM 7. The VCM 7 and the magnetic head are connected to a circuit board by a flexible printed circuit (FPC) 8 made of polyimide.

At the time of start of the magnetic head, the actuator assembly 6 having taken refuge on the ramp 1 is moved by the VCM 7 in a direction in which the head slider 5 is loaded on the magnetic disk 80. After the completion of an initial operation, the actuator assembly 6 is positioned at a predetermined track position by a control circuit. The present invention concerns a circuit for driving the actuator assembly of the magnetic disk apparatus having the above-mentioned construction and a method of performing the driving. The details thereof will now be described by use of FIG. 2.

Figure 2:
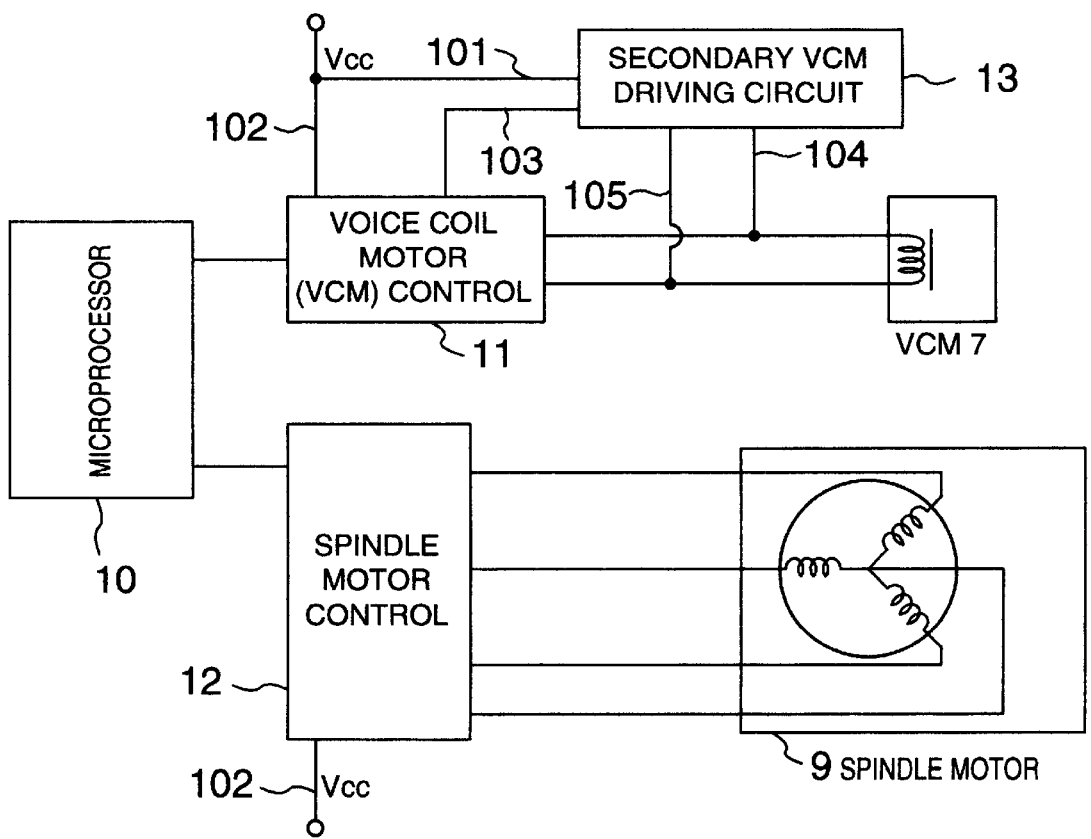
FIG. 2 is a block diagram showing the basic construction of a control system in the present invention.

FIG. 2 is a block diagram showing an example of the driving circuit according to the present invention.

When a power source is turned on, a power source voltage Vcc from a main power source as primary electric power supplying means is inputted through a line 102 to a VCM control circuit 11 and a spindle motor control circuit 12 in accordance with a command from a microprocessor 10. A predetermined voltage is applied from the spindle control circuit 12 to a spindle motor 9 so that the spindle motor 9 is rotated at a fixed speed.

In a usual unloading operation, the power source voltage Vcc inputted to the VCM control circuit 11 is supplied to the VCM 7 with the voltage controlled to a voltage required for driving the VCM 7. Also, the power source voltage Vcc is supplied through a line 103 to a secondary VCM driving circuit 13 as secondary electric power supplying unit so that it is stored a capacitor or the like (not shown) which is electric power storing unit.

When the supply of the power source voltage Vcc is interrupted owing to the cut-off of the power source, the VCM control circuit 11 becomes inoperative so that no DC voltage is developed across lines 101 and 103. As a result, the secondary VCM driving circuit 13 is activated so that a necessary voltage is supplied to the VCM 7 through lines 104 and 105 by use of a voltage stored in the secondary driving circuit. In the present embodiment, a voltage is stored in the capacitor and the stored voltage is used at the time of cut-off of the power source to perform an unloading operation. Even if the power source is cut off, the spindle motor continues its rotation since the motor has a predetermined inertial mass. In another method, therefore, a back electromotive force of the spindle motor at this time may be used.

Figure 3:
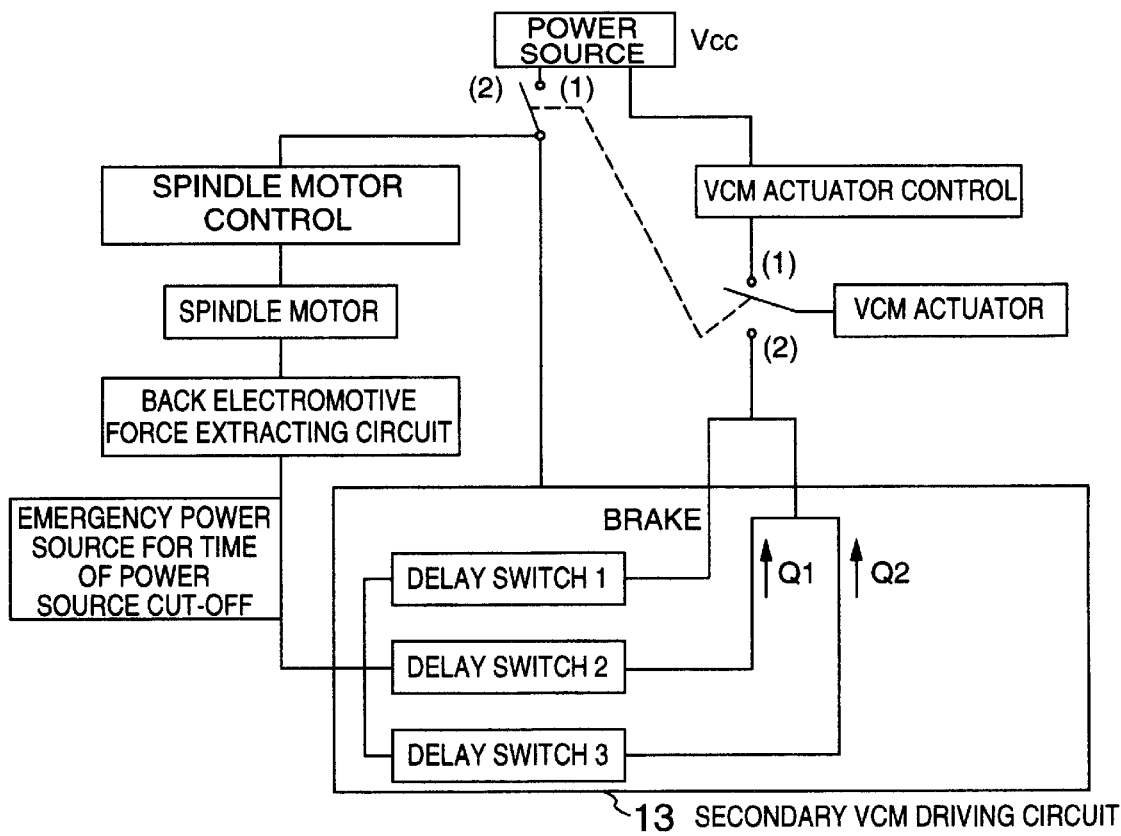
FIG. 3 is a diagram showing an embodiment of the construction of the present invention.
Figure 4:
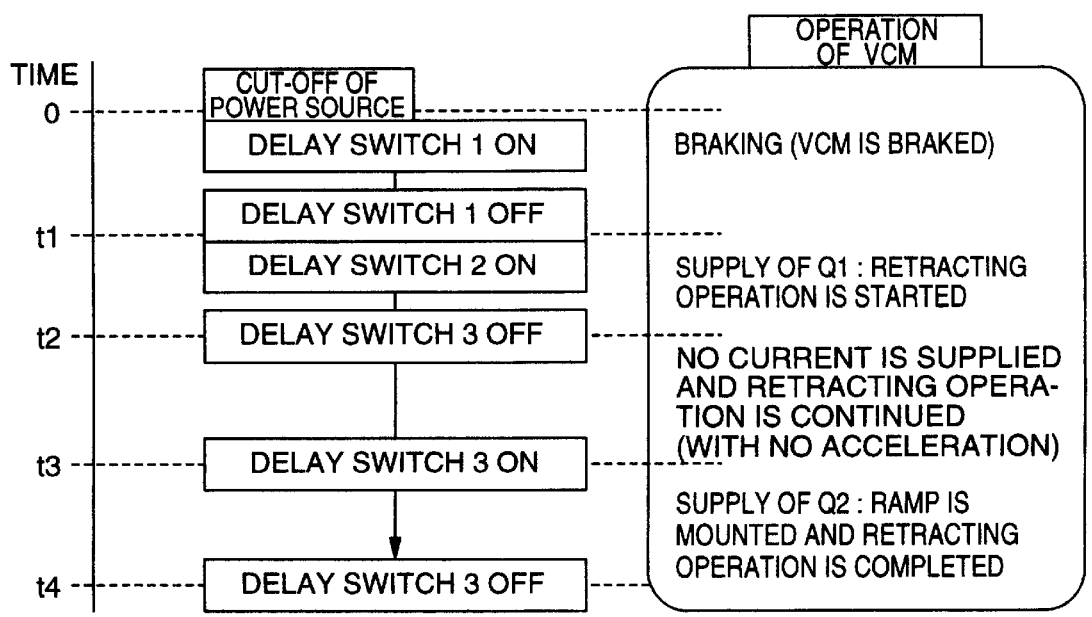
FIG. 4 is a diagram for explaining the operation in the embodiment shown in FIG. 3.

FIG. 3 shows the flow of a retracting operation when the back electromotive force of the spindle motor is used. Also, FIG. 4 shows the turn-on and turn-off states of delay switches and the operating states of the VCM at each instant of time.

When the power source is cut off, the switch is changed over from a (1) side to a (2) side in FIG. 3 so that the spindle motor control circuit 12 and the power source are disconnected from each other. Also, the VCM control circuit 11 and the VCM 7 are disconnected from each other while the secondary VCM driving circuit 13 and the VCM 7 are connected. The secondary VCM driving circuit 13 is connected to a back electromotive force extracting circuit connected to the spindle motor 9 and is supplied with a voltage from the back electromotive force extracting circuit.

The secondary VCM driving circuit 13 is provided with three delay switches. When the power source is cut off, a first delay switch 1 is first turned on to perform a brake operation of stopping the VCM 7. At an instant of time t1 or after a time until the VCM 7 is fully stopped, the delay switch 1 is turned off and a second delay switch 2 is turned on so that a first electric power Q1 for retraction is supplied. Thereby, a retracting operation is started.

At time t2 after the lapse of a fixed time from time t1, the delay switch 2 is turned off so that no electric power is supplied. Thus, the retracting operation is continued with no acceleration. Thereafter, a third delay switch 3 is turned on at time t3 so that a second electric power Q2 for retraction is supplied up to time t4.

The suspension 3 of the actuator assembly 6 attached to the VCM 7 reaches the ramp 1 in a time up to time t3. The mounting of the suspension 3 on the ramp 1 is completed through the second power supply, thereby completing the retracting operation.

An emergency power source used herein is a back electromotive force generated until the motor is fully stopped, as mentioned above. However, there may be considered a method in which charges are stored as an auxiliary power source in a capacitor at the time of usual turn-on of a main power source and the stored charges are used as the emergency power source.

Figure 5:
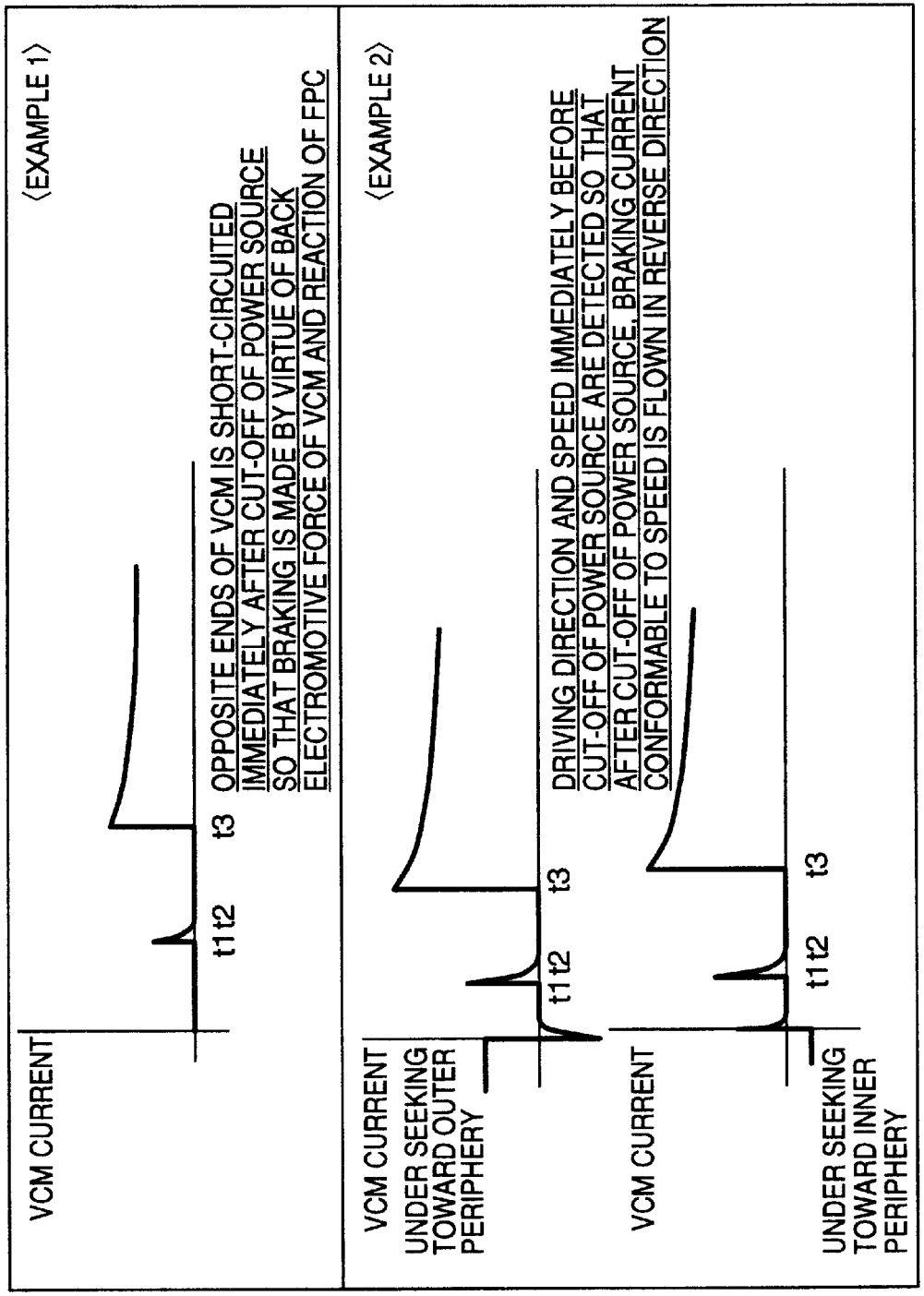
FIG. 5 is a diagram for explaining the operation of a voice coil motor in the present invention.

FIG. 5 shows examples of the braking unit.

A first example 1 corresponds to a method in which opposite ends of the VCM 7 are short-circuited immediately after the cut-off of a power source so that the braking is made by a back electromotive force of the VCM 7 itself. It is assisted by a reaction braking of the FPC 8. In the case of this example, the back electromotive force does not act unless the actuator assembly 6 is operating. However, this provides no problem since if the actuator assembly 6 lies in a stopped condition, it is only required that the stopped condition is held.

In a second example 2, there is provided means for detecting the VCM driving direction and speed immediately before the cut-off of a power source. Immediately after the cut-off of the power source, the power supply depending on the result of detection is performed, that is, an electric power proportional to the detected speed is supplied in a direction reverse to the detected direction. In the case where the operation of seeking toward the outer periphery is being performed, a current to be flown for braking has a direction reverse to that of a retracting current. On the other hand, in the case where the operation of seeking toward the inner periphery is being performed, the direction of the braking current is the same as that of the retracting current.

A specific example of the set times shown in FIG. 4 is as follows. Namely, t1, t2, t3 and t4 are set to 5 msec, 7 msec, 20 msec and 100 msec, respectively.

There may be given an example of setting in which a VCM current flown by the electric power supplied in the first retracting operation (t1 to t2) is set to about 10 mA and a VCM current flown by the electric power supplied in the second retracting operation (t3 to t4) is set to about 100 mA.

Figure 6:
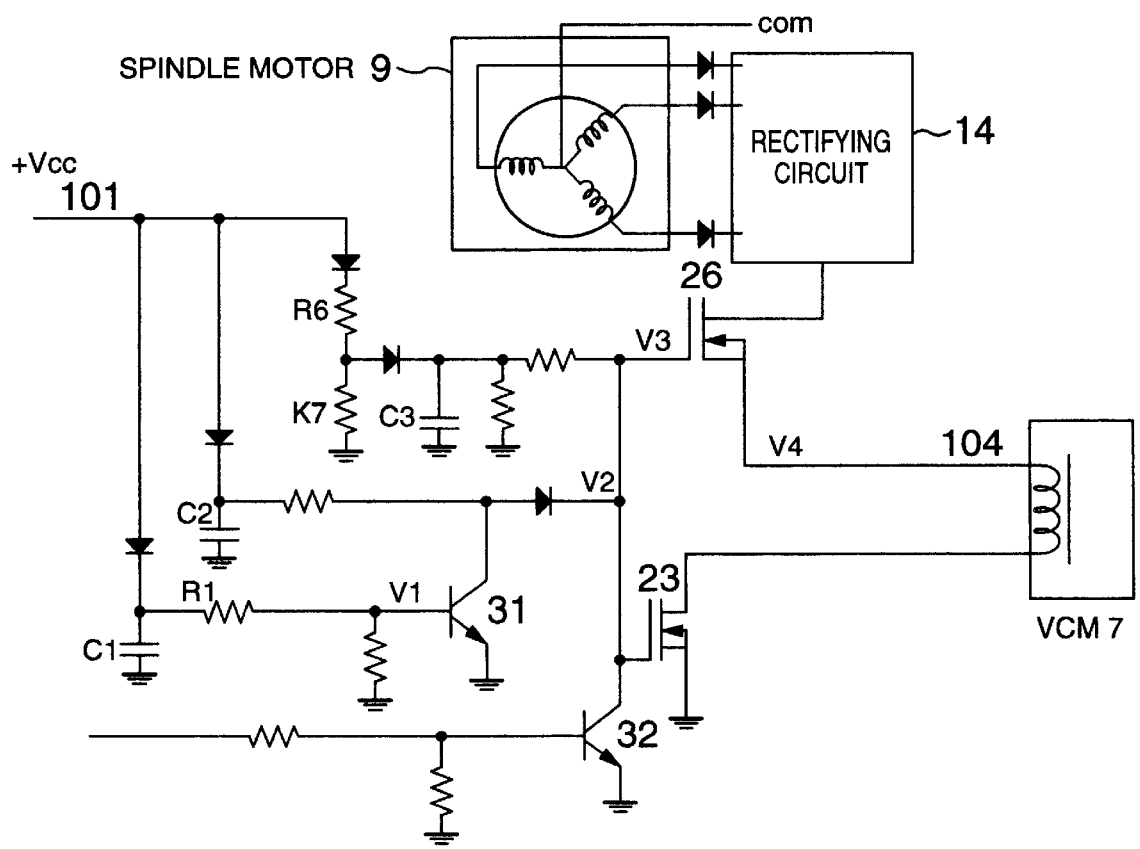
FIG. 6 is a circuit diagram for explaining the circuit of a spindle motor section in the present invention.

The delay switch is constructed by a circuit which includes, for example, a capacitor and a resistor. The delay switch operates at the time of cut-off of the power source. FIG. 6 shows, as an embodiment of the delay switch, an example of a time difference supplying circuit for supplying the first and second retracting powers after the completion of braking.

The delay switch 1 is disposed at an upper stage of the circuit shown in FIG. 6. In a state in which the delay switch 1 takes a turned-on condition, no retracting current is supplied by the shown circuit or the braking operation is being performed.

There is shown an example in which a back electromotive force of the spindle motor 9 continuing its rotation by virtue of inertia after the interruption of power supply from the power source is used as a VCM driving power after the interruption of interruption of power supply. The back electromotive force of the spindle motor 9 is supplied from the line 104 to the secondary VCM driving circuit through a rectifying circuit 14.

A transistor 31 under usual operation assumes a turned-on condition so that the secondary VCM driving circuit 13 and the VCM 7 are disconnected from each other. During the supply of an electric power from the power source, charges are supplied to capacitors C1, C2 and C3 in the secondary VCM driving circuit. At this time, the capacitor C3 is supplied with charges satisfying the relation of Vcc×R6/(R6+R7) owing to a relationship between resistors R6 and R7.

When the power source is cut-off so that a power source voltage Vcc disappears, a transistor 32 becomes inactive and the capacitor C3 is disconnected from the power source supplying line 101 by a diode existing on the upstream side. Charges from the capacitor C3 make field effect transistors (FET's) 23 and 26 active so that charges from a back electromotive force of the motor are flown to the line 104.

Figure 7A:
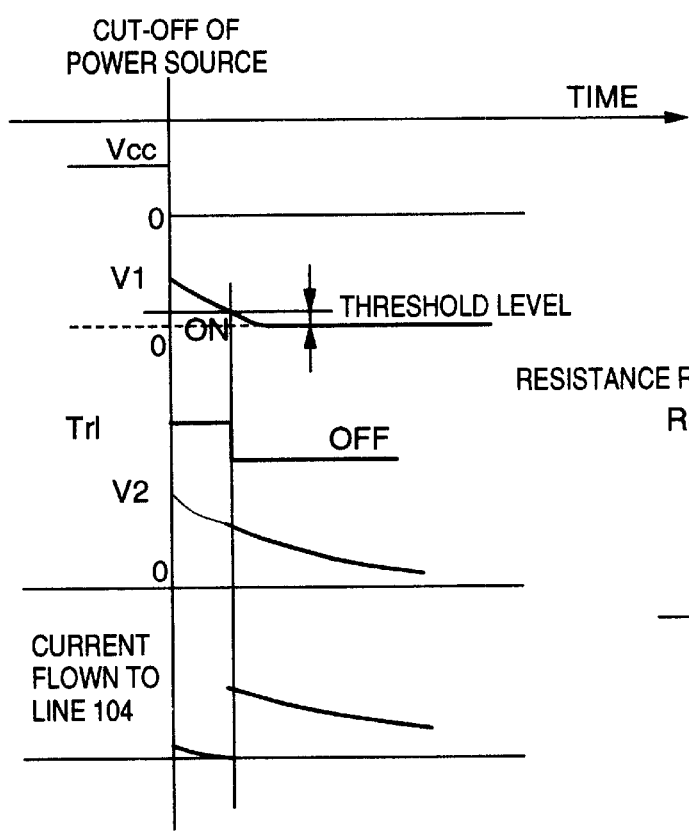
FIGS. 7A and 7B are diagrams for explaining the operation of the circuit shown in FIG. 6.
Figure 7B:
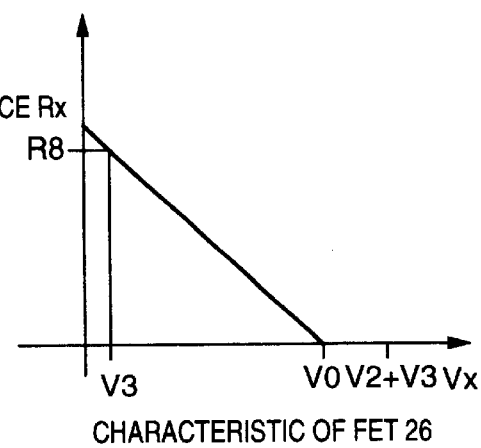

Hereupon, the FET 26 exhibits, for a voltage applied thereto, a characteristic as shown in FIG. 7B.

Provided that a voltage applied from the capacitor C3 is V3, it is assumed to the line 104 that the FET is equivalent to the resistance of R8. Charges flown from the capacitor C2 are grounded through the transistor 31. When a voltage applied to the transistor 31 becomes lower than a threshold level, the transistor 31 becomes inactive so that the charges delivered from C2 are flown through the FET 26. Provided that a voltage applied from the capacitor C2 is V2, there results in that a voltage of V2+V3 is exerted on the FET 26.

Hereupon, the FET 26 becomes equivalent to the resistance of 0 owing to the characteristic shown in FIG. 7B. A time until the FET becomes active and takes the resistance of 0 is determined by that time-dependent change of the voltage applied to the transistor 31 which is set by the capacitor C1 and a resistor R1.

A current flown to the line 104 through the series of operations is shown in FIG. 7A.

The magnitude or amplitude of a current flowing at the first stage immediately after the cut-off of the power source is set by use of the relationship in magnitude between R6 and R7. With this setting, the speed of the retracting operation at the first stage after the cut-off of the power source can be lowered, thereby making the speed of impingement upon the ramp low so that the damage is suppressed.

There may be an example in which a capacitor as electric power storing means is used in lieu of the use of the back electromotive force of the spindle motor 9 shown conjunction with the above-mentioned embodiment, the principle of the operation in this case is similar to that in the above-mentioned embodiment.

In the foregoing embodiment, there is used a retracting method in which a first power supply is performed immediately after the interruption of power supply and the switch is then operated after the lapse of a fixed time so that the next power supply is started. Namely, the operating period of the switch for power supply is set beforehand. In this method, however, it is not possible to perform an accurate position control. Therefore, a control corresponding to the position of the actuator assembly may be considered.

Since the position immediately after the interruption of an electric power from the power source is grasped before the interruption, there may be a method in which an electric power for stopping the actuator assembly is supplied in accordance with that position and an operating condition or the actuator assembly is stopped by use of a back electromotive force of the VCM 7. There is a method in which at the time of stop of the power source, the respective power supply times are determined from the position to make the control or the control is performed with the time selected from a table having supply times set corresponding to positions beforehand. Particularly, in regard to a position on the front side of the ramp, the determination thereof at a high precision is required. A control with the high precision can be realized by using a separately provided sensor, as will be mentioned hereinafter.

Another embodiment will now be described in conjunction with an example in which means for detecting the arrival of the actuator assembly at an unload point (or the vicinity of a position at which the actuator assembly contacts the ramp) is provided, a first power supply is performed immediately after the interruption of power supply and a switch is thereafter operated at the unload point (or the vicinity of the position of the actuator assembly contacting the ramp) so that the next supply is started.

In the present embodiment, a circuit for extracting the change of a back electromotive force generated by the VCM 7 is provided as position detecting means. During a retracting operation based on a first power supply, a back electromotive force caused from the operation is generated by the VCM and a VCM current in the retracting direction decreases. Thereupon, when the actuator assembly contacts the ramp 1 and mounts on the same, a force in a direction reverse to the retracting direction is applied to the VCM. Therefore, the speed is reduced so that the back electromotive force is decreased. As a result, the decrease of the VCM current in the retracting direction is ceased. At this point of time, a second power supply is performed.

In the present embodiment, it is possible to set the second power supply at a position at which the actuator assembly contacts the ramp. Therefore, the speed of impingement upon the ramp can be set more surely, thereby making it possible to reduce the damage of the ramp. Also, since the actuator assembly is accelerated immediately after the mounting of the actuator assembly on the ramp, it becomes possible to retract the actuator assembly more surely to a predetermined position for retraction.

As another construction of the present invention, there is a method in which a magnet switch as means for detecting the arrival of an actuator assembly at an unload point (or the vicinity of a position at which the actuator assembly contacts the ramp) is provided in an actuator and a base (or a cover), a circuit including a capacitor for supplying an electric power to the magnet switch after the cut-off of a power source, and an electric power is supplied using the detection signal. Thereby, an impact caused by the impingement of the actuator assembly upon the ramp portion can be controlled so that it does not take a magnitude larger than a predetermined level.

As is apparent from the foregoing, the present invention relates to a method and an apparatus for retracting a magnetic head slider of a magnetic disk device when the power supply from a power source is interrupted. In particular, the present invention enables the retraction (or unloading) with which the damage of a ramp in a ramp type load/unload mechanism mounted magnetic disk apparatus is reduced.

What is claimed is:

1. A control method for retracting a head positioning actuator assembly of a magnetic disk apparatus to a retracted position at a time of interruption of electric power supply to the magnetic disk apparatus, comprising the steps of:
   decreasing a speed of moving said actuator assembly once after interruption of the electric power supply by dynamic braking;
   moving said actuator assembly acceleratedly towards said retracted position with a first speed; and
   supplying electric power and running said actuator assembly on said retracted position with a second speed greater than the first speed of said actuator assembly.

2. A control method for retracting a head positioning actuator assembly of a magnetic disk apparatus to a retracted position at a time of interruption of electric power supply to the magnetic disk apparatus, comprising the steps of:
   supplying electric power for driving said actuator assembly so as to move said actuator assembly acceleratedly with a first speed after decreasing a speed of moving said actuator assembly at a time of interruption of the electric power supply by dynamic braking; and
   supplying electric power to run said actuator assembly on said retracted position with a second speed higher than the first speed.

3. A magnetic disk apparatus including a rotatable magnetic disk, a disk driving motor for driving said magnetic disk, and a magnetic head facing a surface of said magnetic disk for reading and writing information from and to said magnetic disk, said magnetic disk apparatus comprising:
   an actuator assembly for moving said magnetic head to a predetermined position;
   actuator driving means for driving said actuator assembly;
   a retracted position portion to which said actuator assembly is retracted at a time of interruption of an electric power supply to said magnetic disk apparatus;
   means for decreasing a speed of movement of said actuator assembly once at a time of interruption of the electric power supply to said actuator driving means and to said disk driving motor by dynamic braking;
   means for moving said actuator assembly acceleratedly towards said retracted position portion with a first speed; and
   means for running said actuator assembly on said retracted position portion with a second speed higher than the first speed.

4. A magnetic disk apparatus including a rotatable magnetic disk, a disk driving motor for driving said magnetic disk, and a magnetic head facing a surface of said magnetic disk for reading and writing information from and to said magnetic disk, said magnetic disk apparatus comprising:
   an actuator assembly for moving said magnetic head to a predetermined position;
   actuator driving means for driving said actuator assembly;
   a retracted position portion to which said actuator assembly is retracted at a time of interruption of an electric power supply to said magnetic disk apparatus;
   means for decreasing a speed of moving said actuator assembly once at a time of interruption of the electric power supply to said actuator driving means and said disk driving motor by dynamic braking while moving said actuator assembly towards said retracted position portion;
   means for moving said actuator assembly acceleratedly towards said retracted position portion with a first speed; and
   means for running said actuator assembly on said retracted position portion with a second speed higher than the first speed.

5. A magnetic disk apparatus including a rotatable magnetic disk, a disk driving motor for driving said magnetic disk, and a magnetic head facing a surface of said magnetic disk for reading and writing information from and to said magnetic disk, said magnetic head disk apparatus comprising:
   an actuator for moving said magnetic head to a predetermined position;
   actuator driving means for driving said actuator assembly;
   a retracted position portion to which said actuator assembly is retracted at a time of interruption of an electric power supply to said magnetic disk apparatus;
   power supply means for decreasing a speed of moving said actuator assembly once at a time of interruption of a current from the electric power supply to said actuator driving means and said disk driving motor when operating said magnetic disk apparatus by dynamic braking;
   means for supplying electric power to move said actuator assembly acceleratedly towards said retracted position portion with a first speed; and
   means for supplying electric power to run said actuator assembly on said retracted position portion with a second speed higher than the first speed.

* * * * *